Patented Apr. 27, 1954

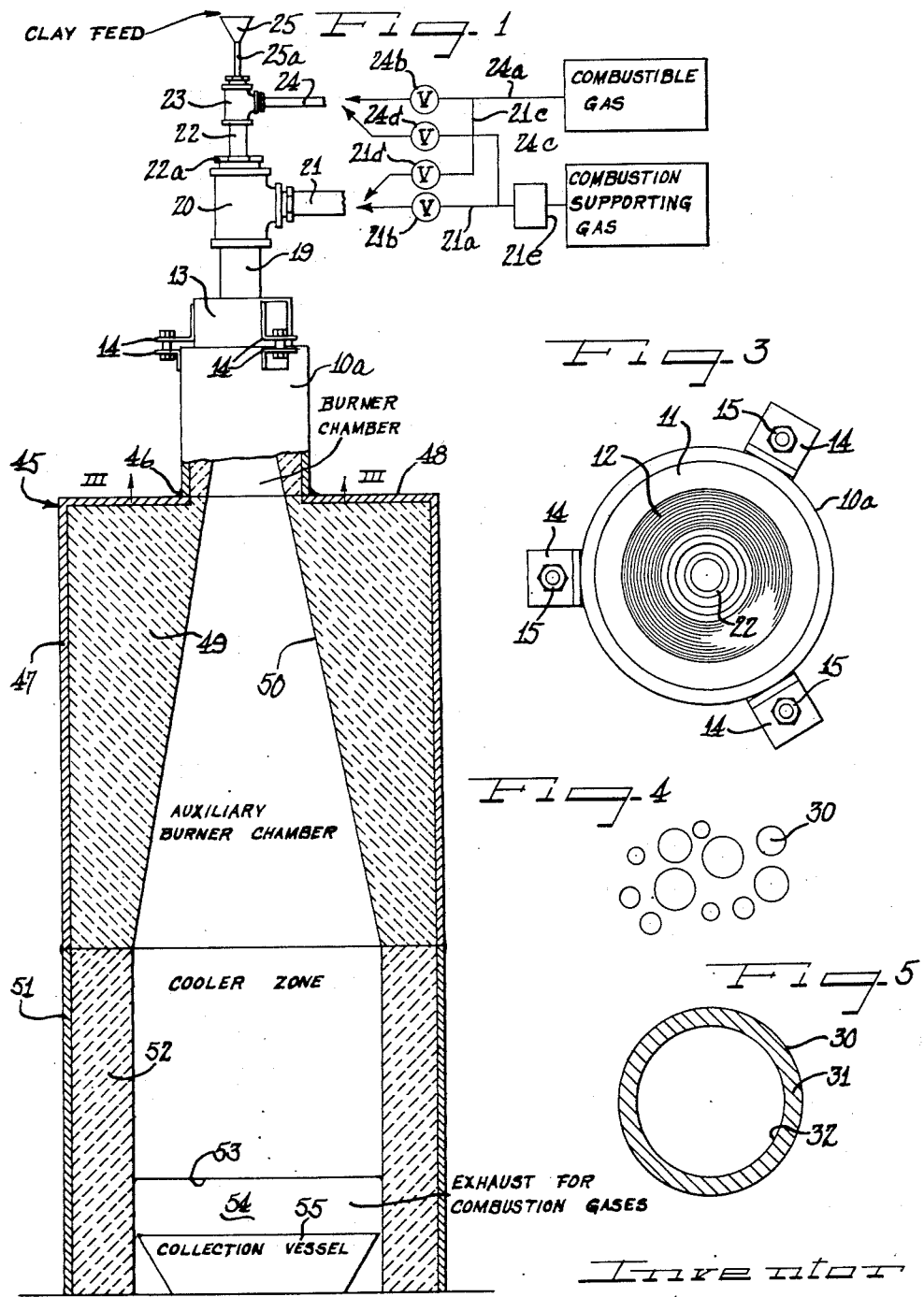

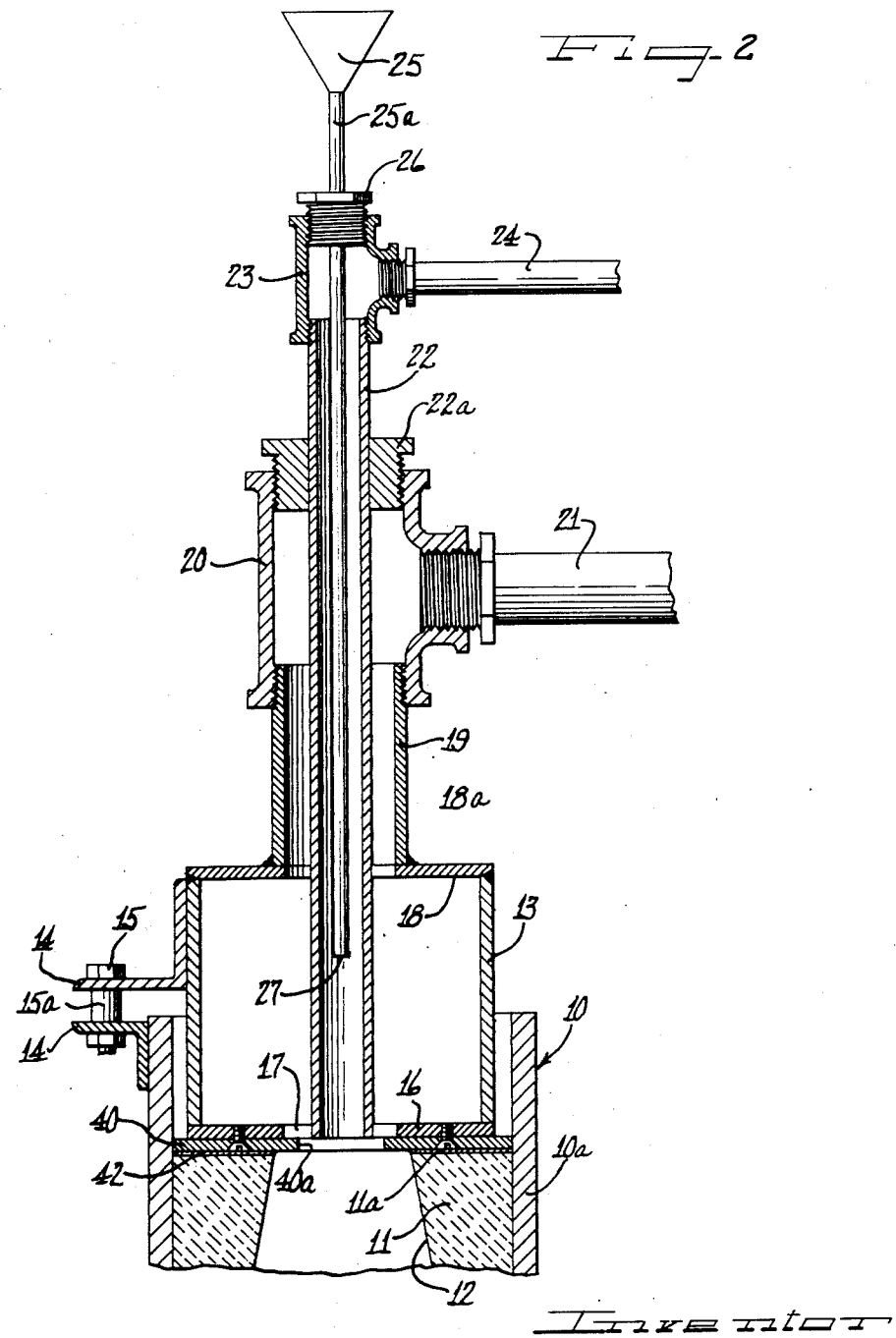

2,676,892

UNITED STATES PATENT OFFICE 2,676,892

METHOD FOR MAKING UNICELLULAR SPHERULIZED CLAY PARTICLES AND ARTICLES AND COMPOSITION THEREOF

Jerome D. McLaughlin, Chicago, Ill., assignor to Kanium Corporation, Chicago, Ill., a corporation of Delaware Application November 13, 1953, Serial No. 391,889

20 Claims. (Cl. 106—86)

This invention relates to a method for spherulizing clay particles, and more particularly, to a method for expanding discrete particles of argillaceous material under controlled temperature and time conditions to produce hollow spheroids of suitable size and uniformity for use as light weight aggregate and the resulting spheroids and articles and compositions containing the same.

It has heretofore been proposed to spherulize various naturally occurring minerals such as volcanic ash, silica, diatomaceous earth and the like. In the process disclosed in the Gilbert Patent No. 1,995,803 for spherulizing glass or similar fusible material, the pulverized and roughly graded starting material is passed through a heating zone in a dispersed condition suspended in a gaseous medium, the heating zone being maintained at a sufficiently high temperature to cause a fusion of the dispersed particles with resulting spherulization. As described in that patent, however, the spherulization reduces the apparent size of the particles from that in the pulverized starting material. This clearly indicates that the spherulized particles are not expanded as compared with the particle size of the starting material but are solid spheroidal particles of necessarily somewhat smaller size due to contraction upon fusion into a spheroidal shape.

It has also been proposed, as in the Christensen et al. Patent No. 2,151,083, to submit silica gel in dry particle form to temperatures sufficiently high to fuse the material and cause an intumescence or puffing of the particle, due to the entrapment of gases in the pores or enclosures within the body of the particle. As a result of being subjected to a flame temperature in excess of 2000° C., the particles are said to fuse and to assume a more or less spherical shape, with the surface of the fused particle continuous and acting as a seal for the numerous internal cells. Experiments made to duplicate the process of this patent indicate that while the surfaces of the particles become rounded, they are not truly spheroidal, nor are the expanded particles unicellular.

In accordance with the present invention, argillaceous material, while suspended in a gaseous medium in finely divided discrete particle form, is subjected to a sufficiently high temperature for a controlled period of time to effect complete fusion of the particles while so suspended, and the particles are then cooled to form hardened unicellular spheroidal particles that remain discrete and unagglomerated. The degree of expansion is indicated by the lower bulk density of the spherulized product. This may be as low as 15 lbs. per cu. ft. and will ordinarily be less than 50 lbs. per cu. ft.

In order to insure spheroidal particles having a thin outer shell with only a single cavity, or cell, defined thereby, the clay particles must be rapidly heated and substantially completely melted and the expanded spheres must be resolidified before the confined but expanded gases can escape. This requires that the expanded spheres be removed from the highly heated zone at the instant of maximum expansion. If the expanded spheres are permitted to remain at above fusing temperatures too long, they will rupture and collapse, while if substantially complete fusion does not take place, the particles are only more or less rounded and not completely spherulized, and are multi-cellular, rather than unicellular.

It is therefore an important object of this invention to provide a method of spherulizing argillaceous material to produce expanded, spheroidal particles, each having a thin, glass-like spherical wall with a single cavity or cell sealed by such wall.

It is a further important object of this invention to provide unicellular spherulized clay particles produced by the method of the instant invention.

It is another important object of the instant invention to provide an improved article of manufacture and/or composition comprising a fusion-integrated binder matrix and a spherulized clay filler.

Still another object of the invention is to provide an improved article of manufacture and/or composition comprising a binder of a hydration-settable type cementitious material, having embedded therein particulate spherulized clay.

Other and further important objects of this invention will become apparent from the following description and the appended claims.

On the drawings:

Figure 1 is an elevational view, with a lower part in vertical section, of apparatus suitable for carrying out the method of this invention;

Figure 2 is an enlarged vertical sectional view of the upper part of the apparatus;

Figure 3 is a sectional view taken along the line III—III of Figure 1;

Figure 4 is an enlarged view of a plurality of expanded, discrete spherulized particles made in accordance with the method of this invention; and Figure 5 is an enlarged cross-sectional view through one of the expanded spherulized particles.

As shown on the drawings:

In Figures 1 to 3 of the drawings, which are illustrative of a type of apparatus suitable for carrying out the method of this invention, the reference numeral 10 indicates the burner structure generally. Said burner structure 10 is of tubular construction, adapted to be installed with its axis vertical. The burner proper comprises a cylindrical shell 10a having a downwardly diverging annular ceramic lining 11 defining a frusto-conical burner chamber 12. A generally cylindrical housing 13 is secured to the upper end of the burner shell 10a, as by means of angle iron brackets 14, securing means 15 passing therethrough and spacing washers 15a. The housing 13 is provided with lower inturned flanges 16 defining a lower central opening 17 axially thereof, and with a centrally apertured upper flange 18.

A short length of pipe or other cylindrical conduit 19 is secured to the upper flange 18, as at 18a, by welding the lower end of said pipe to the flange. A T 20 is connected to the upper end of the pipe 19 and is provided with an intake conduit 21 adapted to communicate with conduit 21a via the valve 21b, through which a combustion-supporting gas, such as air or oxygen, is introduced into the interior of the T and thence through the pipe 19, the housing 13 and the orifice 17 into the burner nozzle 12.

A removable orifice plate 40 is attached to the underside of the flange 16, as by means of screws 41. A seal 42, suitably made of asbestos or the like, in the form of an annulus, is positioned between the upper end surface 11a of the ceramic lining 11 and the under surface of the orifice plate. Thus, by proper selection of the spacing washers 15a, the bolts 15 can be tightened to exert pressure upon the seal 42 and effect a seal thereby between the burner chamber 12 and the upper end of the burner shell 10a. Also, this construction permits orifice plates of different size orifices to be used, depending upon the size of orifice that may be best suited for obtaining the temperature that is desired within the burner chamber 12. Thus, the orifice 17 is made of a diameter equal to the largest diameter of orifice that will be required, while the orifice 40a of the orifice plate 40 will control the flow of gas from the interior of the housing 13 into the burner chamber 12.

A pipe 22 extends vertically through a plug 22a in the T-fitting 20 and through the pipe 19 and housing 13 to terminate at its lower end within the orifice 17. The lower end of said pipe 22 is centered with respect thereto and with respect to the orifice 40a to provide an annular discharge opening into the burner chamber 12. A smaller T-fitting 23 is secured to the upper end of the pipe 22 and is provided with an inlet 24 adapted to communicate with the conduit 24a via the valve 24b to permit intake of a combustible gas. A feed hopper 25 and tubing 25a extend vertically through a plug 26 in the upper opening of the T 23 to terminate within the pipe 22, as at 27, spaced inwardly from the lower end of said pipe 22.

It will be noted that the inlet 24 is also adapted to communicate with the conduit 24c via the valve 24d through which the combustion supporting gas may enter. Also, the intake conduit 21 is adapted to communicate with the conduit 21c via the valve 21d through which combustible gas may enter. By means of such an arrangement either combustion supporting gas or combustible gas, or both, may enter the system at either the inlet 24 or the intake conduit 21, or both. Preferably, air preheated as at 21e is fed controllably through the valve 24d into the inlet 24; and combustible gas is fed controllably through the valve 21d into the intake conduit 21, the valves 21b and 24b being closed. It has been found that better results are obtained using preheated air at the inlet 24 to operate as initial carrier for the particulate argillaceous material to be spherulized.

As shown in Figure 1, the burner chamber 12 continues downwardly beyond the lower end of the shell 10a. This can be accomplished either by an integral continuation of the shell 10a and refractory lining 11, or, more suitably, by a separate auxiliary housing, such as that indicated by the reference numeral 45, sealed to the lower end of the shell 10a, as at 46. Said auxiliary housing 45 comprises a cylindrical casing 47 having an apertured upper wall 48, sealed at 46 to the casing 10a as by welding. A refractory lining 49 provides a continuation of the refractory lining 11 within the casing 47. Said refractory lining 49 has a downwardly divergent conical inner wall 50 forming a smooth continuation of the burner chamber 12. A lower cylindrical casing 51, of the same diameter as the casing 47 and either integral therewith or welded thereto, is lined with a cylindrical refractory liner 52 of the same inside diameter as the maximum diameter of the refractory lining 49. At some point toward the lower end of the cylindrical housing 51, said housing and the liner 52 are broken away at opposite sides thereof, as at 53, to provide an opening 54 therebeyond for the escape of combustion gases to the outside of the cylindrical casing 51. A receptacle 55 is positioned within the casing 51 at a suitable level below the lower edge 53 defining the opening 54.

By virtue of the construction of the burner and auxiliary housings just described, various advantages are obtained. In the first place, the ingress of any air from the outside into the interior of the burner housing 10a or the auxiliary housing 45 is prevented by the seal provided by the asbestos seal 42 and by the welding of the casings 10a and 45. This is very important, since if any air from the outside is admitted into the burner chamber it is not only difficult to control the temperature of the flame within the chamber but the air leaking in creates disturbing eddy currents that interfere with the control of the time of contact between the clay particles and the hottest point of the flame. This hottest point of the flame is regulated so as to occur within the burner chamber 12 and in one practical installation is about six inches below the orifice 40a and the orifice plate 40.

Another advantage of the construction described is that the volume flow of gases through the interior of the main and auxiliary burner housing remains practically constant until the gases are discharged through the openings 54. This is accomplished by proper dimensioning of the downwardly divergent inner walls of the refractory linings 11 and 49. If there were not an expanding volume provided in the direction of flow of the gases of combustion through the burner and auxiliary burner chambers, the velocity of the gases of combustion would increase due to the increase in volume as combustion takes place.

However, by providing downwardly divergent walls in the burner chamber and auxiliary burner chamber, the velocity of the burning gases is kept more or less constant or even retarded and this gives a longer retention of the particles within the burner and auxiliary burner chambers before reaching the receptacle 55. As indicative of gas volume velocities employed with a burner of the type here shown, a velocity of about 0.2 cu. ft. per second was determined as the velocity passed the edge 53 (Figure 1).

The material to be spherulized is introduced into the feed hopper 25 for entrainment in discrete particle form in the flow of combustible gas and/or combustion supporting gas introduced through the intake 24, and thence into the burner chamber 12, where admixture with the combustion supporting gas and/or the combustible gas introduced through the intake 21 takes place. Preferably, the combustible gas flows on the outside of the pipe 22 within the pipe 19 and housing 13 for discharge into the burner chamber 12 through the annular portion of the orifice 40a.

As starting material, any suitable argillaceous material may be employed. One of the clays found most satisfactory is a shale identified as Maquoketa shale from the Clinton, Iowa, area. Another clay giving good results is that found as shale overlying coal seams in the Wilmington area of Northern Illinois.

The argillaceous material in its as-received form is first dried, either with the application of heat or in the air, to reduce the free moisture content to around 2 or 3% by weight. By the term "free moisture content" is meant the moisture content that can be removed by oven drying at a temperature of around 105° C. The term, therefore, does not include the more firmly bound water of hydration present in all naturally occurring clays, which can be removed only at much higher temperatures. Drying to the extent that water of hydration is removed, although not necessary, has also been found to be not harmful for the purposes of the invention. Drying at all is not necessary, but is preferred in order that the grinding and screening operations may be more readily carried out.

The dried argillaceous material is then put through a series of crushing and grinding operations and screened. In general, it is preferred to screen the crushed and ground material through a 20-mesh sieve or, preferably, a 35-mesh screen, and then, by means of an air classifier, discarding all material that passes 150-mesh and, preferably, that which passes 100-mesh. No particular mesh range between 35 and 100-mesh is preferred, but in order to get uniformity of expanded spherulized particles, the starting material for any one batch should be within as narrow a range of screen sizes as is practical, say with a range difference of 15 to 20 meshes between the finest and coarsest particles. The use of such a narrow range of screen sizes for a given batch is essentially a matter of industrial expediency, however, for the purposes of obtaining a uniform product, and does not, as such, affect the mechanics of the spherulization of the individual particles. Moreover, the maximum particle size of about 20-mesh is preferred for the instant operating conditions, at which it is possible to obtain excellent results; but the inventive process is operative using particle sizes as great as about 4 mesh. In many instances it may be desired to carry out the process of the invention employing the larger particle sizes so as to effect a saving in crushing and grinding, at a possible sacrifice in quality of the spherulized material.

The substantially uniformly sized particles of argillaceous material are then fed by a vibrating feeder (not shown) into the hopper of the burner apparatus illustrated in Figures 1 to 3. The particles in discrete form are entrained in the stream of gas entering at the inlet 21, and pass through the flame formed in the burner chamber 12 and are carried along with the flow of combustion gases and by gravity to be collected in their expanded state in the container 55. The container 55 is at a sufficient distance from the burner chamber 12 to provide a relatively cooler zone, in passing through which solidification of the particles occurs before hitting the container. Thus, before the particles come into substantial contact with each other or with a supporting surface, they are sufficiently solidified as not to agglomerate.

As an example of the rates of gas flow found to produce the desired temperature and the best results, a combination of city gas and oxygen was used in which the rate of city gas flow was 66.7 cubic feet per hour and the rate of oxygen flow was 122.5 cubic feet per hour. It has been determined that this ratio of city gas to oxygen is very critical, minor deviations in any direction resulting in little or no expansion of the particles. If hydrogen were used in place of city gas, the flow rates would be somewhat different but should be regulated to give substantially the same flame temperature, which is between about 2500 and 4000° F., with a narrower preferred range of between 2500 and 3500° F.

In addition to the critical relationship between the combustible gas and oxygen, it is extremely important that the particles of argillaceous material be so fed as to pass through the center of the flame, which at its hottest will be of a fairly constant length, as for instance about six inches in length in the examples herein given. In the apparatus shown in Figures 1 and 2, the feed pipe 21 extends to within about three inches or so of the orifice 40a, at which the flame starts. The feed pipe is centered axially of the pipe 22 and of the orifices 17 and 40a and the burner chamber 12, so that all particles will fall through substantially the same length of the flame and will be heated sufficiently to cause substantially complete fusion and spherulization. If the feed pipe is not substantially centered, the particles will fall through the edges of the flame and therefore may not be heated sufficiently to cause melting and spherulization.

As typical of conditions used in successful runs of argillaceous material processed in accordance with the method of this invention, the following table is given. In this table the starting material in each of the tests was a Maquoketa shale having the following typical analysis:

|  | Percent |
|---|---|
| Iron oxide ($Fe_2O_3$) | 5.36 |
| Sodium oxide ($Na_2O$) | 0.13 |
| Potassium oxide ($K_2O$) | 2.77 |
| Ignition loss | 14.26 |
| Sulfur trioxide | 0.43 |
| Carbon (C) | 2.97 |
| Carbon calculated to carbon dioxide | 10.90 |
| Carbon dioxide ($CO_2$) present as carbonates | 7.06 |
| Organic matter | 2.38 |
| Combined water | 4.82 |

TABLE I

*Treatment of coarse shale fractions with new burner*

| Test No. | Inlet Gas Flow | | Size of Feed mesh | Finished Product | |
|---|---|---|---|---|---|
| | Hydrogen C. F. H. | Oxygen C. F. H. | | Bulk Density g./cc. | Water Floated Percent by volume |
| 1 | 95 | 32.5 | 50–65 | (¹) | 60 |
| 2 | 95 | 32.5 | 35–50 | (¹) | 55 |
| 3 | 65 | 35 | 65–80 | 0.676 | 55 |
| 4 | 115 | 35 | 35–50 | 0.536 | 70.5 |
| 5 | 125 | 35 | 35–50 | 0.450 | 75 |

¹ Not determined.

Figures 4 and 5 illustrate the type of expanded, spherulized, unicellular particles that are obtained as a result of the method of this application. These particles, indicated generally by the reference numeral 30 are true spheroids, each having a thin, spherical shell 31 and a single cavity 32 within said shell wall. In general, the size of spherulized particles will vary in accordance with the particle size of the starting material and the nature of the starting material and conditions of treatment, but the desirable particles run between about 50 and 500 microns in diameter. This represents an expansion of approximately 5 to 50 diameters.

In order to produce spherulized particles of the type and uniformity indicated, the conditions under which the discrete particles of the starting material are subjected to fusing temperatures must be closely controlled. As already pointed out, the flow ratios of combustible gas to combustion-supporting gas must be kept within narrow ranges and the particles must be so fed as to pass through the center of the flame so that there will be uniform exposure of each particle to the flame temperature, which should be in the neighborhood of between 2500 and 4000° F. The optimum time of exposure of the particles to a six inch long flame at a temperature of about 3400° F. has been found to be 0.015 second. This time may vary, depending upon the nature of the starting clay and the temperature of the flame that is employed.

As previously pointed out, the method of this invention is based upon a control of conditions such that the clay particles are rapidly heated and substantially completely fused, yet cooled sufficiently rapidly from the fused state to confine the expanding gases and thereby provide a thin outer shell and a single cell, or cavity. This means that the expanded spheres must be removed from the fusing temperatures at the instant of maximum expansion and then cooled to effect solidification before the spherulized particles come in contact with a supporting surface or with each other.

The selection of a particular starting clay and a particular set of operating conditions for the purpose of obtaining optimum results is, of course, essentially a matter of experiment in the light of the aforementioned teachings. However, it has been found that certain chemical and physical properties of the clays in correlation with the operating conditions described, may be used as criteria to indicate when superior results will be obtained.

It will be appreciated that the mechanics of the instant spherulization process involve closely timed fusion and generation of expanding gases. Although the clays contain several sources of expanding gases, recent tests indicate that one of the principal sources is ferric oxide, which releases oxygen according to the equation:

$$2Fe_2O_3 \rightarrow 4FeO + O_2$$

It is believed that most of the other potential gas sources will have been rendered substantially ineffective before fusion temperature of the clay is reached. Of course, other potential sources are also effective, but it has been found that noticeably superior results are obtained using clays having from about 2–3 to about 10 weight percent $Fe_2O_3$ (based upon clay dried to 2–3 weight percent moisture content). At below 2 weight percent the effectiveness of the $Fe_2O_3$ is not appreciable and at above 10 weight percent the $Fe_2O_3$ is apparently so effective as a gas releasing agent that it is difficult to control. Optimum results are obtained at about 6 weight percent $Fe_2O_3$.

It will, of course, be appreciated that the effectiveness of a particular gas releasing source depends to a substantial extent upon the precise temperature at which the clay fuses and the particular character of the fused clay. Thus, if the fusion temperature is high, the gas releasing agent should be most effective at that temperature or closer control of such operating conditions as the speed of heating may be necessary. On the other hand, if the viscosity of the fused "glassy" phase of the clay is relatively low, the vigorousness of the gas releasing reaction may have to be controlled to prevent rupture of some of the expanding fused particles, and this may be done by operating at temperatures as low as about 2000° F.

One of the conditions affecting the foregoing gas releasing action of ferric oxide is the oxidizing or reducing character of the atmosphere, since a reducing atmosphere apparently tends to encourage the release of oxygen under the instant operating conditions. It has been observed that noticeably superior results are obtained using a reducing atmosphere in the practice of the invention by, for example, employing from 60–75 percent of the air (or oxygen) stoichiometrically necessary to effect combustion of the combustion gas in the combustion area. Preferably, about two-thirds of the necessary stoichiometric quantity of air is used, which is equivalent to about a 6:1 ratio of air to Chicago city gas.

As hereinbefore mentioned, the expansion gas release should be timed to coincide with the fusion of the particles to the glassy state. Also, the clay material in the glassy state should have sufficient viscosity to entrap and retain the expanding gases. The force of the expanding gases may be controlled to some extent by the factors hereinbefore mentioned; and the viscosity of the glassy material may be affected by the chemical composition thereof.

The principal components of the clays are, of course, $SiO_2$ and $Al_2O_3$, and it has been found that superior results are obtained if the $$SiO_2 : Al_2O_3$$

weight ratio is within the range from about 3:1 to about 8:1, and is preferably about 3.5:1. Also, it has been found that superior results are obtained if the total weight content of CaO plus MgO in the clay is less than about 16 percent, since excessive amounts of such components tend to alter the fusion characteristics of the clay so as to render control of the instant process more difficult.

The pyrometric cone equivalent (PCE) or fusion point test is another indication of the fusion characteristics of the instant clays. The pyrometric cone test is a well known test procedure used in the ceramics arts, and need not be described herein. In general, it has been found that superior results are obtained in the practice of the invention using clays having a fusion point between cone 02 (2003° F.) and cone 11 (2345° F.) as determined in the neutral atmosphere of an electric furnace.

A recently completed analysis of Maquoketa shale shows the following chemical composition:

| | Weight percent |
|---|---|
| Potassium oxide ($K_2O$) | 2.14 |
| Sodium oxide ($Na_2O$) | 0.50 |
| Magnesium oxide (MgO) | 5.35 |
| Calcium oxide (CaO) | 7.12 |
| Iron oxide (FeO) | 1.29 |
| ($Fe_2O_3$) | 4.07 |
| Aluminum oxide ($Al_2O_3$) | 14.52 |
| Silicon dioxide ($SiO_2$) | 48.80 |
| Ignition loss | 17.45 |

$Al_2O_3 : SiO_2 = 1:3.36$
PCE cone 3–5

The product produced by the method described herein may be used as light weight aggregate in plaster, bricks and concrete, and in thermal and acoustical structures and coatings.

As indicative of the compaction strength of the final product herein described, the following is a comparison between such product and a commercial form of expanded perlite:

*Compaction test*

| | Applicant's Product (100% floated) | Expanded Perlite |
|---|---|---|
| Pressure required to compress column: | | |
| 1 inch _____ p. s. i__ | 800 | 96 |
| 2 inches _____ p. s. i__ | 1,280 | 192 |
| 3 inches _____ p. s. i__ | 4,240 | 400 |
| (80% floated)— | | |
| 1 inch _____ p. s. i__ | 392 | |
| 2 inches _____ p. s. i__ | 1,000 | |
| 3 inches _____ p. s. i__ | 6,992 | |

Where both applicant's product and the commercial form of perlite were all graded to the following mesh:

| | Mesh |
|---|---|
| 49.2% | 30–35 |
| 28.0% | 35–50 |
| 22.8% | 50–65 | the comparison was as follows:

| | Applicant's Product (80% floated) | Expanded Perlite |
|---|---|---|
| 1 inch _____ p. s. i__ | 416 | 64 |
| 2 inches _____ p. s. i__ | 1,040 | 120 |
| 3 inches _____ p. s. i__ | 7,280 | 480 |

The compaction test employed in making the above test is that approved by the Bureau of Reclamation, Denver, Colorado.

The term "100% floated," or "80% floated," as applied to applicant's product means, respectively, that all of the spheres tested had previously been floated to insure perfect spheres, or that 80% of the spheres had been floated.

In addition, I should like to point out that certain uses for the spherulized clay particles prepared by the instant method have resulted in the production of uniquely superior results, particularly in the construction arts. Also, I have found that those spherulized clay particles formed by carrying out the preferred methods herein set forth are the most preferred for use in the compositions embodying the use aspects of my invention. The uses for the spherulized clay particles of this invention fall into two general categories, namely, with fusion-integration type binders and with hydration-settable type binders.

*Fusion-integration type binders*

The fusion-integration type binder composition of the instant invention, preferred for use in preparing the instant units or articles, comprises a fusion integration type binder and a 0.1–5 times the weight thereof or particulate spherulized clay. By "fusion integration type" binder is meant a binder that is suitable for use in fusion integration, as described, whereby such binder is capable of undergoing an initial fusion during the shaping and integration of such an article. Such a binder may be permanently thermoplastic in that it may be repeatedly used or melted, or such a binder may be thermosetting, such as certain of the synthetic resins which are capable of undergoing an initial heat-effected fusion, but which subsequently are set by the reaction of the heat so as to form a substantially infusible material.

The compositions of the instant invention may consist essentially of only the binder and spherulized clay, as a filler therefor, and in such case the spherulized clay employed may range from the minimum amount of spherulized clay which may be employed in order to appreciably or noticeably bring about an improvement, which is about 0.1 of the weight of the binder, to the maximum amount of spherulized clay which may be cohesively held together by the binder, which is about 5 times the binder weight. Preferably, the binder to spherulize clay weight ratio is from about 1:3 to 2:1, and most preferably, about 1:2.

In many instances, however, it may be preferable to employ the spherulized clay as only a portion of the total filler in the filler-binder composition. In such cases, it is usually necessary that the spherulized clay comprises at least about 5 weight percent of the total filler, in order to obtain the beneficial effect thereof, and, preferably, at least about 25% of the weight of the total filler. It will, of course, be understood that the most advantageous results are obtained in the practice of the instant invention wherein substantially all of the filler is spherulized clay, or at least, substantially all of the inorganic, non-fibrous, fine particle sized filler is spherulized clay. However, it will be appreciated that for many special purposes, it may be desirable to employ spherulized clay in combination with various other filler or reinforcing materials.

As used herein, the term "spherulized clay" means argillaceous material which has been treated to produce expanded unicellular discrete unagglomerated spheroids or particles by the method hereinbefore described. The degree of expansion is indicated by the lowermost density of the spherulized product. This may be as low as 15 pounds per cubic foot and will ordinarily be less than 50 pounds per cubic foot.

In general, the sizes of the spherulized particles vary in accordance with the particle size of the starting material and the nature of the starting material and conditions of treatment (all of which considerations are explained in detail hereinabove), but the desirable particles run between about 50 and 500 microns in diameter. This would ordinarily represent an expansion of approximately 5 to 50 diameters. A typical analysis of the screened analysis of particulate spherulized clay products, having a bulk density of 30 pounds per cubic foot is as follows:

| Mesh | Percent |
| --- | --- |
| On 28 | 0.4 |
| On 35 | 43.3 |
| On 48 | 34.4 |
| On 65 | 13.8 |
| On 80 | 1.4 |
| On 100 | 4.3 |
| Through 100 | 2.3 |
| | 99.9 |

The spherulized clay particles thus employed in the instant invention have bulk density of about 15–50 per cubic foot and are at least about 80–90% within the screen analysis range of about 28–100 mesh. Preferably, the spherulized materials are employed in the unagglomerated particulate form just described, in the practice of the instant invention. It will, of course, be appreciated that agglomerates thereof may be prepared for special uses, for example, by employing suitable agglomerating cements and the like.

It is believed that the particular advantages of the instant invention may best be appreciated by separate consideration of each of several formulations which may be employed in the use of various specific preferred embodiments of the invention.

For example, suitable brick specimens were prepared by admixing 5 parts by volume of the 30 pounds per cubic foot spherulized clay just described with one part by volume of a fusible Chicago-area brick making clay. Shaped specimens of the mix were dried in gas-fired oven at about 250° F. overnight and then fired on a rapid schedule to 1850° F. (i. e., about one hour heating). The resulting specimens were found to have very good strength and to have uniquely low density.

As will be appreciated, the softening point of the spherulized clay of the invention is usually not appreciably lower than about 2000° F. (depending to some extent upon the particular type of clay employed in the preparation of the spherulized clay). In the practice of the instant invention fusible ceramic cement or brick-forming clay may be used having a fusion range starting below the softening point of the spherulized clay and preferably starting below about 1900° F. (having a fusion point or range within the region of 1500–1900° F.), so that such fusible material may be fired to fusion temperatures without the necessity of heating the mix to a temperature above the softening point of the spherulized clay. As will be noted, any fluxing agent in such fusible clay which might be inclined to reduce the softening temperature of the spherulized clay by coaction therewith would ordinarily be unable to accomplish this purpose during the firing of the particular brick specimen and, as a preferred matter of practice in the instant invention, the firing of the brick specimens embodying the invention should be so carried out that no appreciable softening of the spherulized clay is accomplished. The extremely low density of the resulting fired specimen is evidence of the fact that softening and/or collapsing of the spherulized clay spheroids has not taken place to an appreciable extent.

Other ceramic specimens, including pottery specimens, may be prepared in a similar manner using suitable fusible ceramic cements such as low-melting glass, silica, and inorganic compositions high in flux-like materials such as CaO, MgO and the like.

In the preparation of asphalt-type building or paving blocks embodying the instant invention, the procedure employed is substantially the same procedure that is employed in incorporating fillers such as sand aggregate in asphalt, except that some or all of the sand aggregate is replaced by the spherulized clay filler, at least 5% of the filler employed being spherulized clay. The resulting asphalt blocks will, of course, have an improved reduction in weight without any appreciable reduction in strength.

Building block or the like units or articles may be prepared similarly from various thermoplastic synthetic resins such as those resins obtained from addition polymerization of compositions comprising one or more substances whose molecules each contain a polymerizable olefinic double bond, such as chloroprene, vinyl chloride, vinyl acetate, styrene, vinylidene chloride, methyl methacrylate, ethyl methacrylate, methyl acrylate, acrylonitrile, and other derivatives of acrylic or methacrylic acid, ethylene, isobutylene, isoprene, butadiene and the like polymerizable unsaturated hydrocarbons, and copolymers and heteropolymers thereof, and mixtures thereof. The preparation of such polymers, copolymers and the like is well known in the art and, in the instant invention, the spherulized clay filler may be added before resinification, as for example, before or during bulk polymerization, but preferably the spherulized clay filler is added, in the proportions hereinbefore mentioned, to the polymerized resin under conditions of heat and/or pressure such as to effect fusion integration of the mix. The instant spherulized clay particles may be admixed readily and, upon cooling of the mix, it will be found that the spherulized clay particles are securely embedded therein and are capable of imparting to the hardened composition those advantageous properties hereinbefore discussed.

An example of a formulation embodying the instant invention which might be used in the preparation of a thermosetting molding composition includes one wherein the principal synthetic resin binder is a polymerized unsaturated polyester. Such a polymerized unsaturated polyester is prepared by a procedure well known in the art, wherein, for example, a charge is prepared consisting of 1.05 mols of monoethylene glycol, 0.8 mol of maleic anhydride, 0.2 mol of phthalic anhydride and an amount of hydroquinone equal to 0.04% of the charge. The charge is heated to 230° C. (over a period of two hours) and is held at 230–235° C. for five hours. The resulting polyester (70 parts), which has an acid member of about 35, is cooled to 60–80° C. and is mixed thoroughly with diallyl phthalate (25 parts) and a paste of tricresyl phosphate (2 parts) and benzoyl peroxide (2 parts), as a catalyst, to form a solution. A composition consisting of 33 parts of the foregoing polymerizable polyester solution, 20 parts of anthophyllite fibers, 20 parts of spherulized clay (30 pounds per cubic foot) and, as a lubricant, 2 parts of zinc stearate may then be worked on a mill or other kneading or mixing device in order to obtain a homogeneous mass. The resulting composition may be molded to obtain uniquely lightweight articles having superior insulating, acoustical, and strength properties, for example, by compression molding for one minute at 4500 pounds per square inch pressure in a mold heated with steam at 75 pounds per square inch gauge pressure to obtain 4-inch diameter disks ⅛ inch thick. During the heating, the polyester solution first fuses so as to form an integral matrix completely enveloping the filler particles and then hardens according to the thermosetting characteristics thereof.

As another exemplary formulation, a small beaker filled with spherulized clay particles, as described hereinbefore, may be filled with an amount of commercially available polyester laminating resin (i. e., diethylene glycol-phthalate-maleate containing suitable air-curing catalysts such as cobalt driers and benzoyl peroxide), the resin filling in the interstices between the spheroids; and the resin may be air-cured to yield an integral lightweight body. In such case, the initial fusion temperature or range of the resin is less than room temperature, but the mix is fusion integrated and the air-cured resin, being thermosetting in nature, is substantially infusible.

As another example, a commercial 50% solids polymeric methyl silicone solution was admixed with about twice its volume of the particulate spherulized clay hereinbefore described and the resulting paste-like mix was air-dried to give lightweight body having the appearance of foamed resin, a film of such resin being light and heat-resistant; in particular, the silicone resin appeared to adhere well to the surface of the clay spheroids.

Another advantage of the instant invention resides in the fact that discrete spheroids of different sizes are obtained during their production and that such different sizes may be separated by screening and a composite graded filler mix may be obtained wherein the spheroid sizes and amounts are graded so that, according to predetermined calculation, a minimum spacial volume of the interstices therebetween may be maintained and a very great saving in the amount of binder used may be effected.

*Hydration-settable type binder*

The binder is a hydration-settable type cementitious binder such as the cement, lime and gypsum binders commonly used in concrete, mortar, plaster and like masonry. In general, each of such binders comprises initially a dehydrated or calcined substance such as Portland cement, lime and gypsum, which is capable of chemically combining with water admixed therewith so as to harden or set to form an article of the substantial strength required for construction.

It is well known that such calcined material, in the presence of suitable particulate siliceous aggregate, may be slaked or admixed with water in an amount sufficient to impart somewhat viscous fluidity or plasticity thereto, but also in an amount such that a substantial proportion of the water present may be chemically combined therewith during the setting or hardening process. The most recent studies of the actual mechanics of the setting operation indicate that the initial setting operation involves the chemical phenomenon of hydration, although subsequent phenomena effecting the final or complete setting of the material may involve reactions such as the combination of hydrated lime with carbon dioxide from the air, the formation of silicate of lime by reaction of hydrated lime with silica in the aggregate, and the crystallization action of water on silicate of lime. In any event, however, the initial hardening or setting action here involved is principally a hydration reaction, and for the purposes of the instant invention such masonry binders are herein referred to as hydration-settable type cementitious binders or materials. In dry and in slaked condition prior to setting the materials are "hydration-settable," and after setting they are "hydration-set."

The hydration-settable type binder composition of the instant invention, preferred for use in preparing the instant construction units, comprises a binder of a hydration-settable type cementitious material and 0.1–5 times the dry weight thereof of the particulate spherulized clay of the instant invention. (As used herein the binder "weight" means dry weight or weight prior to the addition thereto of water for slaking.) The binder may, of course, be dry or slaked; or it may be in the hydration-settable stage or in a hydration-set stage. As hereinbefore mentioned, such hydration-settable type materials are well known in the construction or masonry art.

In concrete, for example, the binder is usually a mixture of calcium aluminates and silicates, prepared by burning a mixture of calcareous and argillaceous materials to clinkering temperature and grinding the resulting clinker. Such a binder is generally referred to as Portland cement. In mortar, the binder usually is Portland cement or calcined lime, such compositions being referred to as "cement mortar" and "lime mortar," respectively. In plaster, the binder usually comprises calcined lime or calcined gypsum ($CaSO_4$), plaster of Paris comprising a partially dehydrated gypsum, $CaSO_4.1/2\ H_2O$. The so-called "quick hardening" cements contain a substantial quantity of alumina ($Al_2O_3$). Various other ingredients, including magnesium oxide (MgO) may also be used to participate in dehydration-setting reaction herein involved.

The compositions of the instant invention may consist essentially of only the binder and spherulized clay, as an aggregate therefor, and in such case the spherulized clay employed may range from the minimum amount of spherulized clay which may be employed in order to appreciably or noticeably bring about an improvement, which is about 1/10 of the binder weight, to the maximum amount of spherulized clay which may be cohesively held together by the binder, which is about 5 times the binder weight. Preferably, the binder to spherulized clay weight ratio is from about 1:3 to about 2:1, and most preferably about 1:2.

In many instances, it may be preferable to employ the spherulized clay as only a portion of the total aggregate in the aggregate-binder composition. In such cases, it is usually necessary that the spherulized clay comprises at least about 10 weight percent of the total aggregate, in order to obtain the beneficial effects thereof, and, preferably, at least about 25% of the weight of the total aggregate. It will, of course, be understood that the most advantageous results are obtained in the practice of the instant invention wherein substantially all of the aggregate is spherulized clay, or at least, substantially all of the aggregate of the fine, sandlike particle size is spherulized clay. However, it will be appreciated that for many special purposes it may be desirable to employ spherulized clay in combination with other aggregate materials.

Another aspect of the instant invention resides in the fact that a relatively coarse agglomerate may be prepared by the use of the so-called "tailings" from the preparation of shale for use in the preparation of the spherulized clay. Such tailings comprise shale particles (obtained after the crushing and grinding of the argillaceous material) that will pass through a 100 mesh screen, therefore having too fine a particle size for ordinary use in the production of spherulized clay as described. The fine shale is used to prepare the coarse aggregate in a process which comprises, for example, pelletizing such shale particles in a rotating drum, after adding about an equal weight of water thereto, and then passing the same through a rotary kiln operating at about 2000–3000° F. and, preferably, 2000–2100° F. The coarse material so obtained is screened through a four mesh sieve, the material passing through having a bulk density of about 61.5 pounds per cubic foot and the material retained on the sieve having a bulk density of about 58 pounds per cubic foot. The material retained on the sieve is rescreened to obtain 3 fractions minus 5/8 plus 3/8, minus 3/8 plus 1/4, minus 1/4, which fractions may be combined to yield a coarse agglomerated aggregate having a density of 50 pounds per cubic foot. Such material, hereinafter referred to as "expanded clay agglomerate" is uniquely useful as an aggregate and is inexpensively produced as a byproduct of particulate spherulized clay productions.

It is believed that the particular advantages of the instant invention may best be demonstrated by a separate consideration of each of several of the specific preferred embodiments of the invention. In a mortar embodiment, for example, two inch mortar cubes were prepared using the particulate spherulized clay hereinabove described having a bulk density of 30 pounds per cubic foot. The cubes were prepared from a composition comprising Portland cement (1 volume-104 grams) and spherulized clay of 35–65 mesh size (5 volume-238 grams), which was slaked, mixed and molded, in the customary manner, as prescribed by Federal specification SS-C-158B. As a control, 2 inch mortar cubes were also prepared from a composition comprising Portland cement (1 volume-104 grams) and finely ground sand (5 volumes-778 grams), which was slaked, mixed and molded, likewise, as prescribed by Federal specification SS-C-158-B.

After the cubes were molded, they were subjected to "damp closet" storage (100% relative humidity and 72° F.) for the next seven days and then removed and tested. All of the cubes were found to have suitably high strength properties. The cubes containing the spherulized clay aggregate were of sufficiently low density to float on water, even immediately after removal from the damp closet. After drying, such cubes had an average weight of 81.5 grams, corresponding to 39 pounds per cubic foot. In contrast, the cubes containing the sand aggregate each weighed 217 grams, or 103 pounds per cubic foot.

Another mortar mix was prepared and tested by first admixing two parts by weight of Portland cement with one part by weight of spherulized clay having a graded particle size to correspond approximately to the screen analysis of a commercially available perlite sample. Such screen analysis was as follows: 49% of minus 30 plus 35, 28% of minus 35 plus 50 and 23% of minus 50 plus 65. The mixture was slaked with an amount of water equal to one-half of the weight of the solids, so as to obtain a mortar having suitable flow properties, which was cast according to standard procedure to provide suitable pieces for compressive and tensile strength tests. It was found that such pieces had compressive strengths of 2215 and 2047 (pounds per square inch) after 7 and 28 days, respectively. The tensile strength of such pieces was 180 and 208 (pounds per square inch) after 7 and 28 days, respecitvely.

A procedure was carried out that is the same as that described in the foregoing paragraph except that the comercial perlite was substituted for the spherulized clay and one and one-half times the total solid weight of water was required to suitably slake the mixture (to obtain fluidity equal to that of the aforementioned slaked mixture), and the test results were 410 and 473 pounds per square inch compressive strength for 7 and 28 days, respectively, 50 and 89 pounds per square inch tensile strength for 7 and 28 days, respectively.

Still another procedure was carried out that is the same as that described in the foregoing paragraph except that the amount of perlite used was an amount equivalent in volume to the spherulized clay used in the procedure just described, and the compressive strength of the resulting product was 1989 pounds per square inch after 7 days standing.

As is well known, the mortar heretofore used consisted of granular siliceous material, such as sand, crushed brick or stone, and a hydration-settable cementitious binder such as lime or Portland cement, which was reduced to a plastic state by slaking with water. In general, the weight ratio of binder to sand used is about 1 to 3–4. In the practice of the instant invention, the amount of spherulized clay used (as aggregate) may range from the minimum amount at which an appreciable improvement may be obtained in accordance with the teachings of the instant invention, which amount is about 10 weight percent of the total aggregate, to the maximum amount which may be used, which is 100% of the total aggregate, or an amount of spherulized clay that is equivalent to 5 times the weight of the cementitious binder. It will be appreciated that, since the spherulized clay may be as much as 4 or 5 times less dense than the usual aggregate sand (which weighs about 80 pounds per cubic foot), the volume proportion of binder and aggregate ordinarily obtained heretofore may be obtained in the practice of the instant invention by the use of a binder to spherulized clay weight ratio of about 1 to 1. Preferably, the binder to spherulized clay weight ratio ranges from about 1 to 2 to about 2 to 1.

As is well known in the construction art, the slaking step in the preparation of mortar, plaster, concrete and the like is dependent to an appreciable extent upon numerous operational details such as the various particle sizes of the binder and aggregate employed as well as the moisture content of each. In the practice of the instant invention it has been found that the water to total solids ratio employed (using Portland cement in the preferred binder-aggregate ratios) in the slaking operation may preferably be about 0.4–0.6 to 1, and most preferably about 0.5 to 1.

which is substantially lower than the amount of water that is ordinarily required in the slaking operation for mortar mixes heretofore used. As is, of course, appreciated, the particular amount of water added is essentially a matter of experiment based on the particular operator's knowledge and experience in the construction art, but in general the principal considerations involved are the addition of an amount of water that is sufficient to render the mix suitably plastic or flowable for handling in normal construction operations and also to avoid adding to the mix an amount of water that is so excessive that the resulting mortar composition in hardened form will be deficient in certain strength properties.

A plaster composition embodying the instant invention was prepared by intimately mixing 100 pounds of calcined gypsum and 2.5 cubic feet of the aforementioned graded spherulized clay (which is about a 1 to 1 volume ratio). The mixture was slaked by the addition thereto of 27 pounds of water for every 100 pounds of solids. The average compressive strength of articles set from the plaster mix was found to be 3220 pounds per square inch.

Other procedures were carried out that were substantially the same as the foregoing procedure except that sand, vermiculite and perlite were substituted for the spherulized clay, and a control specimen was prepared using only the gypsum binder to obtain neat plaster, and the compressive strength results so obtained are summarized in Table II below:

TABLE II

*Compressive tests on plaster specimens*

| Specimen Compositions | Average Compressive Strength, lbs./sq. ft. | Average Density, lbs./cu. ft. | Slaking Mix Water, lbs./100 lbs. |
|---|---|---|---|
| Neat plaster | 6,104 | 102.8 | 34.6 |
| Sand-plaster | 2,685 | 119.5 | 14.3 |
| Vermiculite-plaster | 948 | 62.6 | 53.4 |
| Perlite-plaster | 1,680 | 59.4 | 52.0 |
| Spherulized clay-plaster | 3,220 | 66.9 | 27.0 |

As can be seen from the foregoing Table II the spherulized clay aggregate may be used to obtain compressive strength in the plaster that are substantially better than those strengths obtained using each of the other aggregate materials set forth, including sand. Also, it will be noted that the amount of water needed for slaking in the spherulized clay composition is substantially less than that needed for slaking in the vermiculite or perlite compositions.

In general, the binder to spherulized clay weight ratios employed in the invention in obtaining operative, preferred and optimum results in plaster production are substantially the same as those set forth for mortar production. Additional strengthening materials such as animal and vegetable fibrous reinforcing materials may be added in the customary amounts. In particular it has been found that plaster-board like articles embodying the instant invention appear to have unusually valuable acoustical and heat-insulating properties.

In connection with the slaking operation, as has been explained, the precise amount of water employed depends on several factors, such as the specific binder employed as well as the binder-aggregate ratio; but, in general, the amount of water used is that which is sufficient to give suitable plasticity or flow properties to the slaked mix to permit its use as a coherent plastic mass and that which is also as nearly as possible the amount of water combinable with the binder to effect optimum strength in the hardened product.

A unique feature of the instant spherulized clay aggregate that is of very great commercial significance resides in the unusual ability of such aggregate to cooperate with the other ingredients of the mix to permit the use of much less slaking water than ordinarily may be required to obtain the necessary flow characteristics. Although the particular phenomena involved in such cooperative action of the spherulized clay must necessarily be quite complex and cannot be fully understood, it is now believed that the spheroidal particle shape is such that it facilitates particle movement within the plastic mass to an appreciable extent although apparently not presenting such a smooth outer particle surface that cement adherence thereto cannot be accomplished suitably. Conceivably, the superior flowing properties thus imparted are based upon chiefly physical phenomena; whereas the superior adherence subsequently obtained is a result of physico-chemical phenomena, the chemical aspects of which involve the $Al_2O_3$ and $SiO_2$ (present in the clay spheres) in the ancillary final setting reactions hereinbefore described.

Referring again to Table II, it will be seen that the spherulized clay mix required about one-half as much slaking water as that required for the other "lightweight" mixes: vermiculite and perlite. In general, the slaking water to total solids weight ratio may range from about 0.2 to 1 to about 0.4 to 1, in the case of the equal volume binder and aggregate plaster mixes just described.

Concrete test pieces were prepared from the following Formula A embodying the instant invention:

| | Wt. Percent | Vol. Parts |
|---|---|---|
| $-\frac{5}{8}''+\frac{3}{8}''$ agglom.[1] | 18.0 | |
| $-\frac{3}{8}''+\frac{1}{4}''$ agglom.[1] | 35.0 | 5.30 |
| $-\frac{1}{4}''$ agglom.[1] | 10.5 | |
| Sized Spher. clay (30 lb./cu. ft.) | 13.5 | 1.96 |
| Portland cement | 23.0 | 1.00 |
| | 100.0 | |
| Water | 19.4 | 33 gals./cu. yd. |

[1] Pelletized kilned shale agglomerate in mesh sizes hereinbefore described.

In preparing the concrete, the dry materials were mixed for a few minutes in a Fleming mixer, then the water was added until it appeared that the concrete was sufficiently plastic or fluid to flow readily. The amount of water added was in the proportion of 33 gallons per cubic yard for the instant concrete mix, and preferably for such concrete mixes the amount of slaking water is about 20–50 gallons per cubic yard.

A slab 2" x 64" was poured in a wooden form to which a Syntron vibrator had been attached. It was found that the minimum vibration for a period of only ten seconds is required to level the slab. Subsequent trowelling produced a good smooth surface. The surface produced by the wooden form upon setting of the concrete was found to be excellent.

For use in thermal conductivity tests, plates 1" x 12" x 12" were also poured at the same time and also 3" by 6" and 6" x 12" cylinders were poured. All such poured specimens were cured for seven days in the "fog room" (100% relative humidity and 72° F.) and then maintained for twenty-one days in an atmosphere of 70° F. and 50% relative humidity.

TABLE III

| Formula | A-II | B-II | C-II | D-II |
|---|---|---|---|---|
| Cement: aggregate ratio (vol.) | 1:7.26 | 1:5.42 | 1:6.00 | 1:5.45 |
| Water, (gals. per cu. yd.) | 33 | 45.6 | 60.2 | 73.4 |
| Slump,[1] fresh concrete (in.) | 7.5 | 2.0 | 2.5 | 2.5 |
| Weight, fresh concrete (lbs./cu. ft.) | 97 | 89.1 | 102.1 | 93.1 |
| Weight, room dry (lbs./cu. ft.) | 89.4 | 83.6 | 97.6 | 88.1 |
| Comp. Strength, 7 day cure (lbs./sq. in.) | 1,905 | 725 | 451 | 175 |
| Thermal conductivity [2] | 2.94 | 3.47 | 4.21 | 2.92 |

[1] Slump is standard fluidity test, showing superiority of Formula A.
[2] B. t. u. per hr., sq. ft., ° F., 1 in. thickness.

In general, the binder to spherulized clay weight ratios employed in the invention in obtaining operative preferred and optimum results in concrete production are substantially the same as those set forth for mortar (and plaster) production. In addition, however, the usual concrete mix comprises coarse aggregate such as gravel or crushed rock, which may be present in a binder to spherulized clay to coarse aggregate weight ratio of about 1:0.1–5:3–5, and preferably about 1:0.5–2:3–5. For special uses other proportions might be used, of course, and additional ingredients including reinforcing metal wires, screens and the like might be incorporated in the concrete.

As is customary in the art of producing construction units comprising hydration-settable type cementitious binders and suitable aggregates, the particular amounts of each ingredient employed are those amounts necessary for each to carry out its own well-known and understood function for the purposes involved in any particular use contemplated. The selection of the specific amounts or proportions is thus to any appreciable extent a matter for the skilled operator's discretion.

An additional feature of the instant invention, however, involves the use of the expanded agglomerate obtained, as described, by treatment of waste products or fines recovered from the initial crushing and grinding steps in the spherulized clay production. Such agglomerates may be obtained in the various particle sizes desired and may be substituted entirely for coarse aggregate in the practice of the invention, so that a binder to fine aggregate to (coarse aggregate) agglomerate weight ratio of about 1:0.5–2:3–5 may be used. In such mix, the fine aggregate may be spherulized clay and/or sand, the bulk of which (i. e. 80%) is within the mesh size range of about 14–200 mesh. The coarse aggregate may be gravel, crushed rock and/or the agglomerate, the bulk of which (i. e. 80%) is greater than 4 mesh particle size, and preferably in the ¼″ to ⅝″ range. In order to obtain an appreciable beneficial effect from the presence of the lightweight agglomerate in the coarse aggregate at least about ten weight percent thereof, and preferably twenty-five weight percent, should be agglomerate.

The spherulized clay aggregate has been found to compare very favorably with "torpedo" sand, ordinarily used in mortars, and to be far superior thereto in certain other physical characteristics. For example, spherulized particles of Maquoketa shale (described in my above mentioned application) which shall henceforth be called "K" aggregate, were examined for their use as aggregate in mortar mixes. Various tests were made in order to determine their mortar-working properties. Samples of mortar using ordinary torpedo sand as the aggregate were run simultaneously.

A screen analysis of ordinary torpedo sand and of the "K" aggregate available for use was made:

| | Sand, Weight Percent | | "K" Aggregate, Weight Percent |
|---|---|---|---|
| Retained on 8 mesh | | Retained on 28 mesh | 1 |
| Retained on 14 mesh | 8 | Retained on 35 mesh | 53 |
| Retained on 28 mesh | 24 | Retained on 48 mesh | 38 |
| Retained on 48 mesh | 48 | Retained on 100 mesh | 8 |
| Retained on 100 mesh | 18 | Through 100 mesh | |
| Retained on 200 mesh | 1 | | |
| Through 200 mesh | 1 | | |
| | 100 | | 100 |

Because the "K" aggregate does not have the same average particle size as the sand, a synthetically graded sand aggregate was made to conform to the "K" aggregate screen analysis.

Thus, three different sets of aggregate were used for the mortar tests:

(1) "R" samples, using regular torpedo sand as received. A comparison of subsequent test results with those of "K" aggregate indicates the effect of grain size, shape, and other physical characteristics in this connection.

(2) "S" samples, graded similarly in particle size to "K" aggregate. This set of samples indicates the effect of reduced grain size only, since aggregate of the same material, namely torpedo sand, was used.

(3) "K" samples, composed of "K" aggregate, which is four and one-half times lighter than sand and spherical in form. The results would be affected by the size requirements plus special "K" aggregate properties such as lightness, sphericity, high strength induced by compression of the glassy spheres and its glassy nature.

Two types of mortar were used in all following tests. These types, recommended by the Structural Clay Products Institute for use in the construction of reinforced and unreinforced unit masonry, are in agreement with the American Standard Building Code Requirements for Masonry as published by the National Bureau of Standards and approved by the American Standards Association.

*Type A mortar.*—Type A mortar is a high strength mortar suitable for general use and recommended specifically for reinforced brick masonry and plain masonry below grade and in contact with earth.

*Type B mortar.*—Type B mortar is a medium strength mortar suitable for general use in exposed masonry above grade and recommended specifically for parapet walls, chimneys and exterior walls subjected to severe exposure as, for example, on the Atlantic seaboard, and also for exposed and load-bearing structural clay tile construction.

The mortar was proportioned by volume as designated in Table IV below:

TABLE IV

*Mortar proportions by volume*

| Mortar Type | Cement | Hydrated Lime | Aggregate Damp Loose |
|---|---|---|---|
| A | 1 (Portland) | ¼ | 3 |
| B | do | 1 | 6 |

The weights of 1 cubic foot of the respective ingredients in the mortar mixes are as follows:

Portland cement, 94 lb. per cu. ft.
Hydrated lime, 40 lb. per cu. ft.
Sand, damp and loose, 1 cu. ft. contains 80 lbs. dry sand
"K" aggregate, 1 cu. ft. contains 17.6 lbs. dry "K" aggregate

(a) Water retention test

The flow of mortar after a suction of one minute is a measure of the water of retentivity. To a small degree, the water of retentivity is a measure of workability. Strength, bond between mortar and brick, volume change and other properties are affected by the water of retentivity.

The recommended specifications for Type A and B mortars contain the requirement that flow after suction for one minute shall be greater than 70 percent of the initial flow.

Six different sets of samples were tested. For mortar type A the sets were AR, AS and AK. For mortar type B the sets were BR, BS and BK, R, S and K signifying the different kinds of aggregate used, namely, regular torpedo sand, a synthetically graded torpedo sand and "K" aggregate.

The test procedures as described in "Specifications for Masonry Cement," ASTM Designation: C91–49, ASTM Standards were closely followed.

A measured amount of water was placed in a large mixing bowl. The cement was added, thoroughly mixed in, and the lime was then added and mixed until the combination was completely wetted or slaked. Approximately one-half of the aggregate was added, and stirring was maintained for 30 seconds. The remainder of the aggregate was then added, mixing and kneading continuing for 75 seconds. The mortar was allowed to stand for 60 seconds. Mixing and kneading then were continued for 60 seconds longer.

The mortar was placed immediately in the flow mold which is a brass mold 4 inches in inside diameter at the base and 2.75 inches in inside diameter at the top and 2 inches in height. The mold, which is placed at the center of the flow table, was filled with the mortar and the mold lifted from the mortar 30 seconds after the mixing operation. The flow table, which is also of brass, consists of a circular top 10 inches in diameter attached to a perpendicular shaft. A cam can be rotated by hand so that the table and attached shaft can be raised to a fixed height of one-half inch and allowed to drop vertically.

Immediately after lifting away the mold from the mortar, the flow table was allowed to drop 25 times in 15 seconds. The increase in mortar diameter divided by the original diameter expressed in percent gave the flow number. A flow of 100–115 was obtained for all specimens.

The mortar on the flow table was immediately remixed for 30 seconds, placed on top of the filter paper in the perforated dish of the water retention apparatus. The mortar was leveled even with a straight-edged trowel. A vacuum of 2 inches of mercury was maintained on the paper for 60 seconds. The mortar was quickly placed on the flow table again and the flow measured. The flow after suction divided by the flow before suction times 100 gave the water of retentivity valve.

The results of the water of retention tests are tabulated in Table V.

TABLE V
Comparison of water of retentivity

| Mortar Type | Aggregate | Retentivity, Percent |
|---|---|---|
| A | R | 76.6 |
| A | S | 68.7 |
| A | K | 76.9 |
| B | R | 85.2 |
| B | S | 76.0 |
| B | K | 80.0 |

Besides comparing favorably with the regular sand mortar in water of retentivity, the "K" aggregate mortar for both A and B types was well above the specification requirement of 70 percent after a one minute suction.

In both the A and B types of mortar it may be seen from the table that the synthetically graded sand, whose aggregate grain size corresponded to the "K" aggregate screen analysis, was much lower in water of retentivity. This shows that, although the aggregate size of "K" aggregate is below that of torpedo sand, its property of water retention is much higher than the sand.

It was also found that "K" aggregate mortar having the same flow number as regular sand motor was a great deal more workable and had high fluidity.

(b) Compressive strength test

Cube specimens (2 inch) were made for type AK and type BK mortar mixes. The testing procedures as described in "Specifications for Masonry Cement," Designation C91–49, ASTM Standards, were rigorously followed.

After obtaining the correct flow from the water of retention procedures, the mortar was placed in the molds in the manner specified in Designation C91–49, section 25, and placed in the moist room for curing. The cubes were removed from the molds after 24 hours and allowed to remain in the moist room for six more days. The 7-day compressive strength tests were made on three of the specimens of each set.

The remaining three specimens were immersed in running water for 21 days and then were removed for the 28-day compressive strength tests. Southwark-Emery and Riehle Testing Machines were used to measure the total compression of the cubes.

Table VI (below) gives the minimum requirements as recommended by the Structural Clay Products Institute, as well as the test results obtained using the AK and BK mortar mixes, as follows:

TABLE VI
Compressive strength of mortar

| Mortar Type | Average Compressive Strength, p. s. i. | |
|---|---|---|
| | 7 Days | 28 Days |
| A (minimum) | 1,500 | 2,500 |
| B (minimum) | 550 | 900 |
| AK | 2,346 | 3,034 |
| BK | 650 | 1,023 |

It is noteworthy to observe that in both the AK and BK types of mortar the strength is above that of the recommended specifications. This is true despite the fact that the water of retention property is much higher for "K" aggregate when a comparison from the standpoint of particle size is considered.

Because of this favorable property and plus the fact that "K" aggregate made an almost too workable mortar at a flow of 100–115, a more suitable measure of the amount of water necessary to maintain the proper consistency was employed, because the flow table drop method, which depends largely upon gravity, should not be used for comparison with mortar made from sand, "K" aggregate being four and one-half times lighter than sand.

Specimens of mortar of R and K aggregate were adjusted to the same consistency as determined by the Vicat plunger method. Table VII shows the results of compressive strengths of the "K" aggregate mortars.

TABLE VII

*Compressive strengths of mortars*

| Mortar Type | Aggregate | Average Compressive Strength, p. s. i. | |
|---|---|---|---|
| | | 7 Days | 28 Days |
| A | K | 2,510 | 2,892 |
| B | K | 948 | 1,285 |

A comparison of these results with those of Table VI shows that a decrease in water due to the Vicat plunger method of measuring consistency gave only a slight increase at 7 days and a slight decrease at 28 days for A type mortars. However, for the B type of mortar, the increase was so great that the "K" aggregate mortar at 7 days had a greater strength than regular sand aggregate mortar.

The breaks in the compression cubes were examined under the microscope and it was seen that "K" aggregate mortar of type A, whether its consistency was measured by the flow table or Vicat plunger, had a considerable amount of its failure through the spheres themselves. In other words, the cement-glassy sphere bond was greater than the cement-cement bond; hence, the compressive strengths were similar in both cases.

Examination of type B mortar mixed by the flow table method showed little or no failure through the glassy spheres. The break was in the cement alone, showing that the cement-glassy sphere bond was weaker than the cement-cement bond. Mortar, whose mixture was measured by the Vicat plunger, however, showed some failure through the glassy spheres, indicating that the cement-glassy sphere bond was stronger than the cement-cement bond in these cases.

(c) *Water repellency test*

Three cubes of each set AR, AS and AK were made. The test was made conforming to Federal Specification No. SS-C-1816, "Federal Specification for Cement, Masonry," section F-3j.

After 7 days curing in the moist room, the cubes were placed in a drying oven for 48 hours at 105–110° C., then removed and placed in air at 21°±3° C. for two hours, weighed to the nearest 0.5 gram and placed in water at 21°±3° C. to a depth of one-fourth inch, with the top side (as cast) downward. After soaking for one hour the specimens were removed, drained for five minutes, excess water wiped off with a damp cloth and weighed. The gain in weight was the one-hour absorption. The specimens were then replaced, one-fourth inch immersed in the water and 24 hours later, removed, drained, wiped, and weighed. The gain in weight over the original dry weight was the 24-hour absorption.

Table VIII shows a comparison of the water repellency of the different types of mortar.

TABLE VIII

*Water repellency of mortars*

| Mortar Type | Aggregate | Absorption, grams | |
|---|---|---|---|
| | | 1 hour | 24 hours |
| A | R | 8.0 | 20.5 |
| A | S | 8.5 | 21.5 |
| A | K | 10.0 | 20.0 |

Although the one-hour absorption for "K" aggregate mortar was higher, the rate of absorption decreased thereafter to a greater extent than R or S aggregate mortars. As the resistance to the flow of fluid is partly dependent on the particle shape, the high one-hour absorption rate indicates the fact capillary action of the more uniformed spaces between glassy spheres as compared to irregular-shaped sand aggregate spaces. The slight increase in absorption of AS over AR in both the one-hour and 24-hour tests shows the influence of graded particle size.

The smaller 24-hour absorption value of "K" aggregate mortar suggests that the packing of the glassy spheres is such as to provide less volume for absorption than the more irregular shaped sand particles.

It will thus be seen that embodiments of the instant invention include such spherulized clay aggregate-binder compositions including dry and wet (water) compositions, plastic or flowable and hardened compositions, and slaked and unslaked compositions, and the articles formed therefrom and the method of making such articles and compositions. The invention is particularly advantageous in the pre-cast "cement" block art and the ready-mix (dry) "cement" art, because of the very great reduction in weight of such compositions and articles which may be obtained in the practice of the invention. In those instances when only part of the ingredients in the mix are to be supplied as a dry ready-mix, the amount of spherulized clay aggregate in such dry ready-mix may be as much as 10 times the weight of the binder present. Such a ready-mix composition might, for example, include a high alumina content binder for quick setting cement and be thus prepared and shipped for ultimate mixing with an additional portion of Portland cement or the like and such other aggregate as may be desired. The principal advantage of dry mixes of spherulized clay particles and binders being that such mixes afford an opportunity for the cement manufacturer to employ superior plant mixing machinery to pre-mix or pre-disperse particularly those ingredients used in small amounts (e. g. salts and the like) in a large volume of spherulized clay aggregate so as to obtain a commercial product for use on the construction site that is not so heavy as to involve prohibitive shipping costs.

It will be understood that modifications and variations may be effected without departing from the scope of the novel concepts of the present invention.

This is a continuation-in-part of my applications Nos. 189,381, filed October 10, 1950; 271,876, filed February 15, 1952; 271,877, filed February 15, 1952; and 279,093, filed March 28, 1952, and each now abandoned.

I claim as my invention:

1. The method of spherulizing and expanding a clay shale, which comprises subdividing said shale into particles of a size ranging between 35 and 100 mesh, feeding said particles in discrete form into a flowing stream of a combustible gas, burning said gas to form a downwardly directed flame having a temperature of between 2500 and 3500° F., largely confining the gases of combustion within an enclosed zone comparatively free of eddy currents that expands in volume in the direction of flow of said gases, introducing said discrete particles suspended in said combustible gas into the center of said flame zone to pass therethrough and freely fall into a cooler zone therebeyond, the time of exposure of the particles to the flame temperature being sufficient to substantially completely fuse the same and effect substantially maximum expansion thereof to unicellular, thin-walled hollow spheres without being sufficiently long to cause rupturing of the thin wall of said spheres, and effecting cooling and substantial solidification of the resulting expanded spherulized particles before the same come to rest.

2. The method of producing expanded, spherulized, thin-walled, unicellular particles for use as a light-weight aggregate, which comprises subdividing a clay shale into particles of about 20 mesh size and smaller, passing said particles in discrete form and suspended in a flowing gaseous medium through a heated zone of predetermined length and having a temperature of between 2500 and 4000° F., subjecting said particles to the heat of said heated zone only for such period of time as to substantially completely fuse said particles and to simultaneously effect volatilization of gasifying components of said clay with resulting expansion of said particles, the temperature and time of exposure to such temperature of said particles being such that substantially maximum expansion of said particles is effected without rupture of the enclosing wall of fused clay formed by the gases generated therewithin, thereby producing thin-walled, unicellular, spheroidal particles of larger size than the original clay particles, and cooling said expanded spheroidal particles to solidify the same before coming to rest, said clay and said expanded spheroidal particles being in a gas suspended dispersed state until said expanded spheroidal particles are sufficiently solidified to prevent agglomeration.

3. The method of producing expanded, spherulized, hollow particles having a thin glass-like wall, which comprises subdividing a clay into particles of 20-mesh sieve size and finer, passing said particles in discrete form and suspended in a flowing gaseous medium through a heated zone of predetermined length and having a temperature of between 2500 and 4000° F., subjecting said particles to the heat of said heated zone for only such period of time as to substantially completely fuse said particles and to simultaneously effect the generation of gas within said clay particles with resulting expansion thereof, the temperature and time of exposure of said particles thereto being such that substantially maximum expansion of said particles is effected without rupture of the enclosing wall of fused clay formed by the gases generated therewithin, thereby producing hollow spheroidal particles having thin glass-like walls, which particles are of larger size than the clay particles from which said spheroidal particles have been formed, cooling said expanded hollow spheroidal particles to sufficiently solidify the same so as to prevent agglomeration thereof, and thereafter collecting the cooled expanded hollow spheroidal particles as a mass of individual unagglomerated particles.

4. As a new product suitable for use as a light-weight aggregate, thin-walled, unicellular, spheroidal particles of clay formed by spherulizing and expanding clay particles by the method defined in claim 2.

5. The method of producing expanded, spherulized, thin-walled, unicellular particles for use as a light-weight aggregate, which comprises subdividing a clay shale into particles of about 4 mesh size and smaller, passing said particles in discrete form and suspended in a flowing gaseous medium through a heated zone of predetermined length and having a temperature of between 2500 and 4000° F., subjecting said particles to the heat of said heated zone only for such period of time as to substantially completely fuse said particles and to simultaneously effect volatilization of gasifying components of said clay with resulting expansion of said particles, the temperature and time of exposure to such temperature of said particles being such that substantially maximum expansion of said particles is effected without rupture of the enclosing wall of fused clay formed by the gaseous generated therewithin, thereby producing thin-walled, unicellular, spheroidal particles of larger size than the original clay particles, and cooling said expanded spheroidal particles to solidify the same before coming to rest, said clay and said expanded spheroidal particles being in a gas suspended dispersed state until said expanded spheroidal particles are sufficiently solidified to prevent agglomeration.

6. The method of producing expanded, spherulized, thin-walled, unicellular particles for use as a light-weight aggregate, which comprises subdividing a clay shale having 2–10 percent $Fe_2O_3$ content into particles of about 20 mesh size and smaller, passing said particles in discrete form and suspended in a flowing gaseous medium through a heated zone of predetermined length and having a temperature of between 2500 and 4000° F., subjecting said particles to the heat of said heated zone only for such period of time as to substantially completely fuse said particles and to simultaneously effect volatilization of gasifying components of said clay with resulting expansion of said particles, the temperature and time of exposure to such temperature of said particles being such that substantially maximum expansion of said particles is effected without rupture of the enclosing wall of fused clay formed by the gases generated therewithin, thereby producing thin-walled, unicellular, spheroidal particles of larger size than the original clay particles, and cooling said expanded spheroidal particles to solidify the same before coming to rest, said clay and said expanded spheroidal particles being in a gas suspended dispersed state until said expanded spheroidal particles are sufficiently solidified to prevent agglomeration.

7. The method of producing expanded, spherulized, thin-walled, unicellular particles for use as a light-weight aggregate, which comprises subdividing a clay shale having 2–10 percent $Fe_2O_3$ content and less than 16 percent MgO plus CaO content into particles of about 20 mesh size and smaller, passing said particles in discrete form and suspended in a flowing gaseous medium through a heated zone of predetermined length and having a temperature of between 2500 and 4000° F., subjecting said particles to the heat of said heated zone only for such period of time as to substantially completely fuse said particles and to simultaneously effect volatilization of gasifying components of said clay with resulting expansion of said particles, the temperature and time of exposure to such temperature of said particles being such that substantially maximum expansion of said particles is effected without rupture of the enclosing wall of fused clay formed by the gases generated therewithin, thereby producing thin-walled, unicellular, spheroidal particles of larger size than the original clay particles, and cooling said expanded spheroidal particles to solidify the same before coming to rest, said clay and said expanded spheroidal particles being in a gas suspended dispersed state until said expanded spheroidal particles are sufficiently solidified to prevent agglomeration.

8. The method of producing expanded, spherulized, thin-walled, unicellular particles for use as a light-weight aggregate, which comprises sub-dividing a clay shale having 2-10 percent $Fe_2O_3$ content and an $SiO_2:Al_2O_3$ weight ratio of 3:1 to 8:1 into particles of about 20 mesh size and smaller, passing said particles in discrete form and suspended in a flowing gaseous medium through a heated zone of predetermined length and having a temperature of between 2500 and 4000° F., subjecting said particles to the heat of said heated zone only for such period of time as to substantially completely fuse said particles and to simultaneously effect volatilization of gasifying components of said clay with resulting expansion of said particles, the temperature and time of exposure to such temperature of said particles being such that substantially maximum expansion of said particles is effected without rupture of the enclosing wall of fused clay formed by the gases generated therewithin, thereby producing thin-walled, unicellular, spheroidal particles of larger size than the original clay particles, and cooling said expanded spheroidal particles to solidify the same before coming to rest, said clay and said expanded spheroidal particles being in a gas suspended dispersed state until said expanded spheroidal particles are sufficiently solidified to prevent agglomeration.

9. The method of producing expanded, spherulized, thin-walled, unicellular particles for use as a light-weight aggregate, which comprises sub-dividing a clay shale having 2-10 percent $Fe_2O_3$ content, less than 16 percent MgO plus CaO content, and an $SiO_2:Al_2O_3$ weight ratio of 3:1 to 8:1 into particles of about 20 mesh size and smaller, passing said particles in discrete form and suspended in a flowing gaseous medium through a heated zone of predetermined length and having a temperature of between 2500 and 4000° F., subjecting said particles to the heat of said heated zone only for such period of time as to substantially completely fuse said particles and to simultaneously effect volatilization of gasifying components of said clay with resulting expansion of said particles, the temperature and time of exposure to such temperature of said particles being such that substantially maximum expansion of said particles is effected without rupture of the enclosing wall of fused clay formed by the gases generated therewithin, thereby producing thin-walled, unicellular, spheroidal particles of larger size than the original clay particles, and cooling said expanded spheroidal particles to solidify the same before coming to rest, said clay and said expanded spheroidal particles being in a gas suspended dispersed state until said expanded spheroidal particles are sufficiently solidified to prevent agglomeration.

10. The method of producing expanded, spherulized, thin-walled, unicellular particles for use as a light-weight aggregate, which comprises sub-dividing a clay shale having 2-10 percent $Fe_2O_3$ content and a PCE fusion point of cone 02 to cone 11 into particles of about 20 mesh size and smaller, passing said particles in discrete form and suspended in a flowing gaseous medium through a heated zone of predetermined length and having a temperature of between 2500 and 4000° F., subjecting said particles to the heat of said heated zone only for such period of time as to substantially completely fuse said particles and to simultaneously effect volatilization of gasifying components of said clay with resulting expansion of said particles, the temperature and time of exposure to such temperature of said particles being such that substantially maximum expansion of said particles is effected without rupture of the enclosing wall of fused clay formed by the gases generated therewithin, thereby producing thin-walled, unicellular, spheroidal particles of larger size than the original clay particles, and cooling said expanded spheroidal particles to solidify the same before coming to rest, said clay and said expanded spheroidal particles being in a gas suspended dispersed state until said expanded spheroidal particles are sufficiently solidified to prevent agglomeration.

11. The method of producing expanded, spherulized, thin-walled, unicellular particles for use as a light-weight aggregate, which comprises sub-dividing a clay shale having 2-10 percent $Fe_2O_3$ content, less than 16 percent MgO plus CaO content, an $SiO_2:Al_2O_3$ weight ratio of 3:1 to 8:1, and a PCE fusion point of cone 02 to cone 11 into particles of about 20 mesh size and smaller, passing said particles in discrete form and suspended in a flowing gaseous medium through a heated zone of predetermined length and having a temperature of between 2500 and 4000° F., subjecting said particles to the heat of said heated zone only for such period of time as to substantially completely fuse said particles and to simultaneously effect volatilization of gasifying components of said clay with resulting expansion of said particles, the temperature and time of exposure to such temperature of said particles being such that substantially maximum expansion of said particles is effected without rupture of the enclosing wall of fused clay formed by the gases generated therewithin, thereby producing thin-walled, unicellular, spheroidal particles of larger size than the original clay particles, and cooling said expanded spheroidal particles to solidify the same before coming to rest, said clay and said expanded spheroidal particles being in a gas suspended dispersed state until said expanded spheroidal particles are sufficiently solidified to prevent agglomeration.

12. The method of producing expanded, spherulized, thin-walled, unicellular particles for use as a light-weight aggregate, which comprises sub-dividing a clay shale having 2-10 percent $Fe_2O_3$ content, less than 16 percent MgO plus CaO content, an $SiO_2:Al_2O_3$ weight ratio of 3:1 to 8:1, and a PCE fusion point of cone 02 to cone 11 into particles of about 20 mesh size and smaller, passing said particles in discrete form and suspended in a flowing gaseous reducing medium through a heated zone of predetermined length and having a temperature of between 2500 and 4000° F., subjecting said particles to the heat of said heated zone only for such period of time as to substantially completely fuse said particles and to simultaneously effect volatilization of gasifying components of said clay with resulting expansion of said particles, the temperature and time of exposure to such temperature of said particles being such that substantially maximum expansion of said particles is effected without rupture of the enclosing wall of fused clay formed by the gases generated therewithin, thereby producing thin-walled, unicellular, spheroidal particles of larger size than the original clay particles, and cooling said expanded spheroidal particles to solidify the same before coming to rest, said clay and said expanded spheroidal particles being in a gas suspended dispersed state until said expanded spheroidal particles are sufficiently solidified to prevent agglomeration.

13. The method of producing expanded, spherulized, thin-walled, unicellular particles for use as a light-weight aggregate, which comprises sub-dividing a clay shale having 2–10 percent $Fe_2O_3$ content into particles of about 20 mesh size and smaller, passing said particles in discrete form and suspended in a flowing gaseous reducing medium through a heated zone of predetermined length and having a temperature of between 2500 and 4000° F., subjecting said particles to the heat of said heated zone only for such period of time as to substantially completely fuse said particles and to simultaneously effect volatilization of gasifying components of said clay with resulting expansion of said particles, the temperature and time of exposure to such temperature of said particles being such that substantially maximum expansion of said particles is effected without rupture of the enclosing wall of fused clay formed by the gases generated therewithin, thereby producing thin-walled, unicellular, spheroidal particles of larger size than the original clay particles, and cooling said expanded spheroidal particles to solidify the same before coming to rest, said clay and said expanded spheroidal particles being in a gas suspended dispersed state until said expanded spheroidal particles are sufficiently solidified to prevent agglomeration.

14. The method of producing expanded, spherulized, thin-walled, unicellular particles for use as a light-weight aggregate, which comprises sub-dividing a clay shale having 2–10 percent $Fe_2O_3$ content, less than 16 percent MgO plus CaO content, and an $SiO_2 : Al_2O_3$ weight ratio of 3:1 to 8:1 into particles of about 20 mesh size and smaller, passing said particles in discrete form and suspended in a flowing gaseous reducing medium through a heated zone of predetermined length and having a temperature of between 2500 and 4000° F., subjecting said particles to the heat of said heated zone only for such period of time as to substantially completely fuse said particles and to simultaneously effect volatilization of gasifying components of said clay with resulting expansion of said particles, the temperature and time of exposure to such temperature of said particles being such that substantially maximum expansion of said particles is effected without rupture of the enclosing wall of fused clay formed by the gases generated therewithin, thereby producing thin-walled, unicellular, spheroidal particles of larger size than the original clay particles, and cooling said expanded spheroidal particles to solidify the same before coming to rest, said clay and said expanded spheroidal particles being in a gas suspended dispersed state until said expanded spheroidal particles are sufficiently solidified to prevent agglomeration.

15. The method of producing expanded, spherulized, thin-walled, unicellular particles for use as a light-weight aggregate, which comprises sub-dividing a Maquoketa shale into particles of about 20 mesh size and smaller, passing said particles in discrete form and suspended in a flowing gaseous reducing medium through a heated zone of predetermined length and having a temperature of between 2500 and 4000° F., subjecting said particles to the heat of said heated zone only for such period of time as to substantially completely fuse said particles and to simultaneously effect volatilization of gasifying components of said clay with resulting expansion of said particles, the temperature and time of exposure to such temperature of said particles being such that substantially maximum expansion of said particles is effected without rupture of the enclosing wall of fused clay formed by the gases generated therewithin, thereby producing thin-walled, unicellular, spheroidal particles of larger size than the original clay particles, and cooling said expanded spheroidal particles to solidify the same before coming to rest, said clay and said expanded spheroidal particles being in a gas suspended dispersed state until said expanded spheroidal particles are sufficiently solidified to prevent agglomeration.

16. The method of producing expanded, spherulized, thin-walled, unicellular particles for use as a light-weight aggregate, which comprises sub-dividing a clay shale into particles of about 20 mesh size and smaller, passing said particles in discrete form and suspended in a gaseous medium through a heated zone of predetermined length and having a temperature of between 2000 and 4000° F., subjecting said particles to the heat of said heated zone only for such period of time as to substantially completely fuse said particles and to simultaneously effect volatilization of gasifying components of said clay with resulting expansion of said particles, the temperature and time of exposure to such temperature of said particles being such that substantially maximum expansion of said particles is effected without rupture of the enclosing wall of fused clay formed by the gases generated therewithin, thereby producing thin-walled, unicellular, spheroidal particles of larger size than the original clay particles, and cooling said expanded spheroidal particles to solidify the same before coming to rest, said clay and said expanded spheroidal particles being in a gas suspended dispersed state until said expanded spheroidal particles are sufficiently solidified to prevent agglomeration.

17. A composition comprising a hydration-settable type cementitious material and 0.1–5 times the weight thereof of thin-walled unicellular spheroidal particles of clay formed by spherulizing and expanding clay particles by the method defined in claim 1.

18. A composition comprising a fusion integration type cementitious material and 0.1–5 times the weight thereof of thin-walled unicellular spheroidal particles of clay formed by spherulizing and expanding clay particles by the method defined in claim 3.

19. A brick comprising a fusion integrated brick-making clay binder-matrix and 0.1–5 times the matrix weight of thin-walled unicellular spheroidal particles of clay formed by spherulizing and expanding clay particles by the method defined in claim 14.

20. A construction composition comprising, as a binder therefor, a material of the class consisting of Portland cement, lime, gypsum and mixtures thereof, and, as an aggregate, 0.1–5 times the weight thereof of thin-walled unicellular spheroidal particles of clay formed by spherulizing and expanding clay particles by the method defined in claim 14.

References Cited in the file of this patent

UNITED STATES PATENTS

| Number  | Name      | Date          |
|---------|-----------|---------------|
| 868,762 | Crow      | Oct. 22, 1907 |
| 1,682,675 | Horsfield | Apr. 28, 1928 |
| 2,136,096 | Benner    | Nov. 8, 1938  |
| 2,340,194 | McMullen  | Jan. 25, 1944 |
| 2,517,993 | Falco     | Aug. 8, 1950  |
| 2,542,992 | Clapper   | Feb. 27, 1951 |

FOREIGN PATENTS

| Number  | Country       | Date          |
|---------|---------------|---------------|
| 117,504 | Great Britain | July 25, 1918 |